Patented Mar. 28, 1944

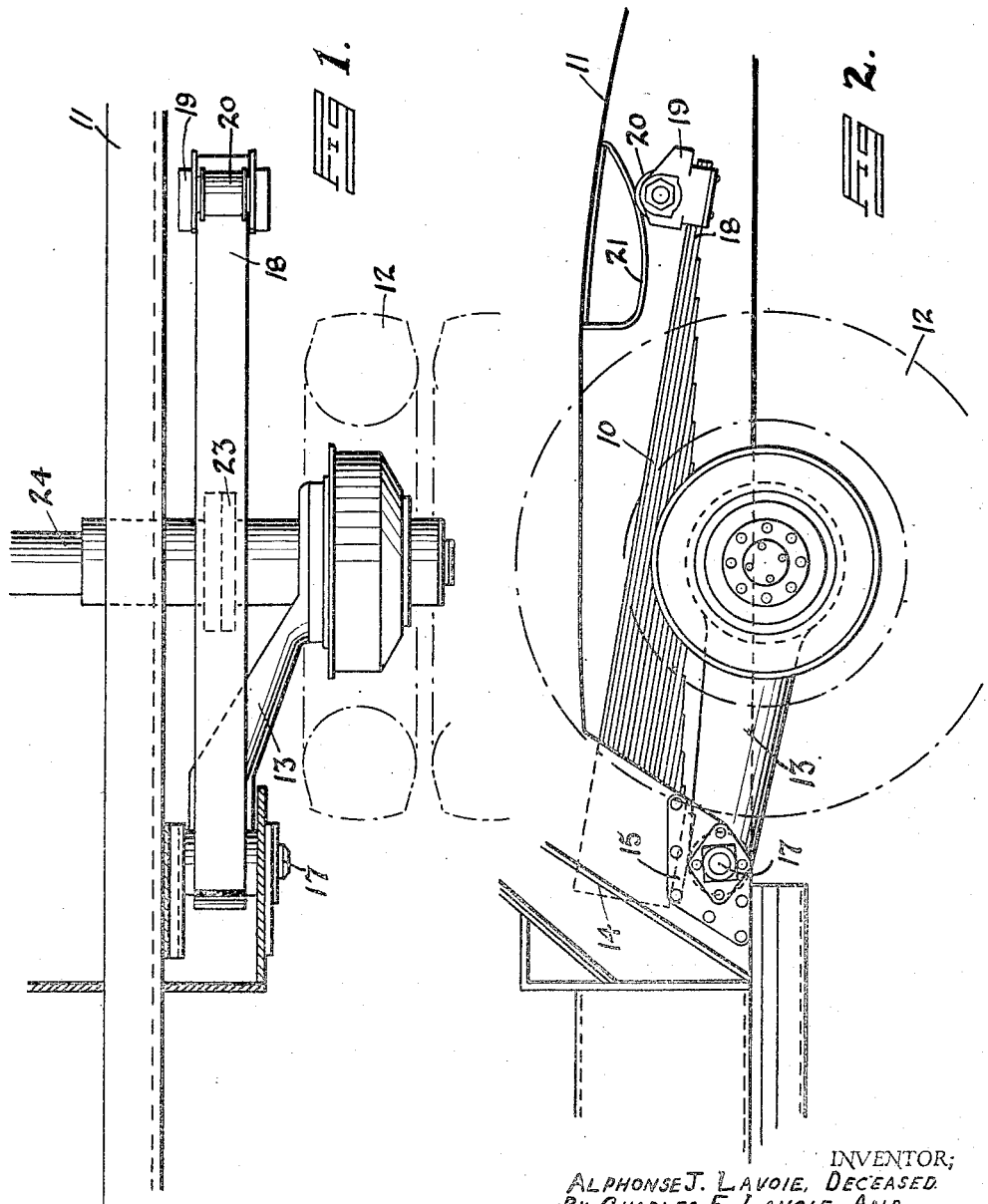

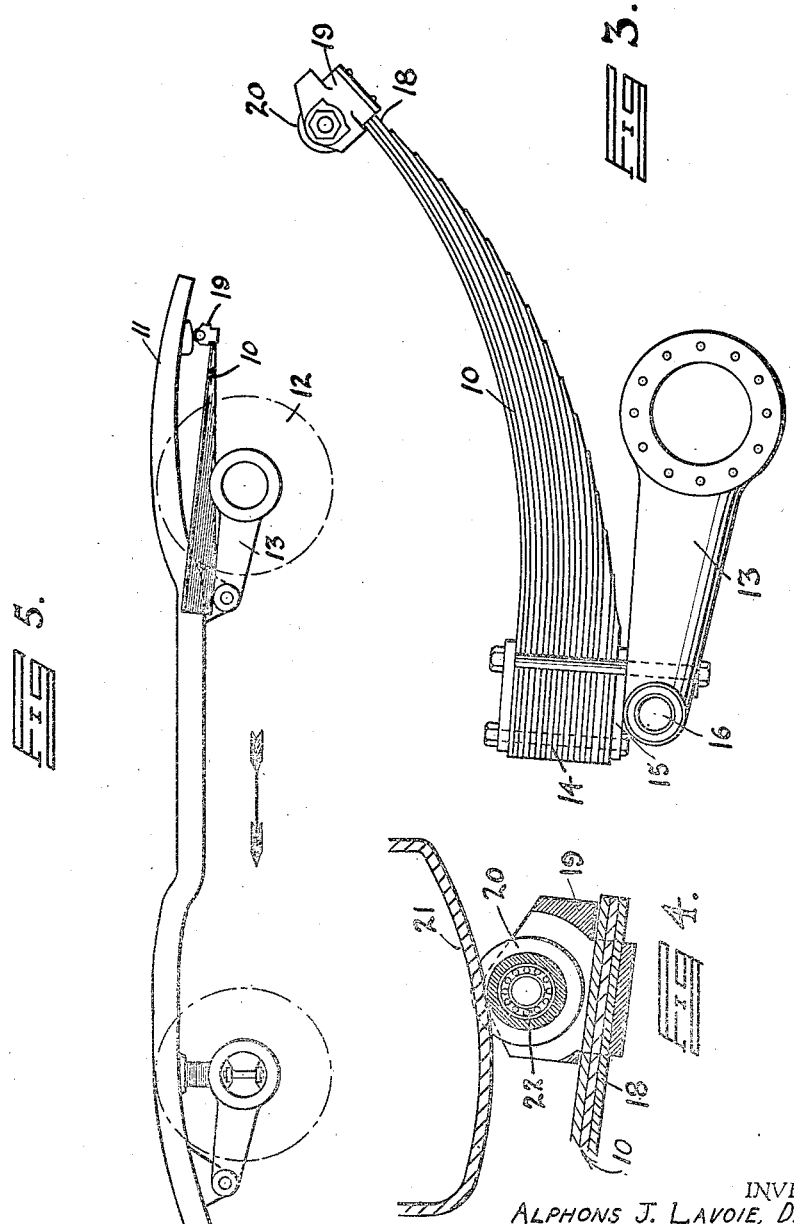

2,345,270

UNITED STATES PATENT OFFICE 2,345,270

VEHICLE SPRING SUSPENSION

Alphonse J. Lavoie, deceased, late of Defiance, Ohio, by Charles E. Lavoie and Edward H. Fauver, administrators, Defiance, Ohio Application July 23, 1940, Serial No. 346,928

3 Claims. (Cl. 267—19)

This invention relates to improvements in vehicle spring suspension and has for its principal object the provision of means for providing independent spring action between the individual wheels and the frame of a vehicle.

A further object of the invention is the provision of means independent of the springs for maintaining the rear wheels in alignment with the frame of the vehicle and for imparting the driving or braking forces to the frame.

A still further object of the invention is the provision of a variable spring mounting structure positioned on the frame in a manner enabling the rising and falling motion of the wheels to vary the effective position of the spring with relation to the frame of the vehicle.

It is also an object to provide a spring mounting which will firmly support the frame upon the wheels and maintain the wheels in alignment but which will permit complete freedom of motion of the wheels in response to road irregularities.

A still further object of the invention is to provide a device of the character described which is simple in construction, economical in manufacture, relatively easy of installation, and which will be relatively trouble-free as compared with various spring suspensions heretofore known to the art.

A still further object of the invention is the provision of a vehicle spring suspension wherein the alignment means utilized for maintaining the road wheel in alignment with respect to the frame of the vehicle is of a trailer type and comprises in effect an arm pivoted to the frame and extending rearwardly therefrom and carrying the road wheel or wheels upon the rearward end thereof.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

The invention is illustrated in the accompanying drawings, wherein:

Figure 1 is a top plan view of a wheel suspension means showing in detail the positioning of the wheel support arm and the spring means affixed thereto.

Figure 2 is a side elevation of the spring suspension means shown in Figure 1 and shows in addition certain details of the frame of the vehicle to which the spring suspension is affixed.

Figure 3 is a side elevation of the spring suspension means showing in detail the trailer type wheel supporting arm and the spring affixed thereto.

Figure 4 is an enlarged cross sectional detail view of the roller device positioned on the free end of the spring shown in Figures 1, 2, and 3.

Figure 5 is a side elevation showing the relative positioning of the wheel suspension means with respect to a vehicle frame. An arrow indicates normal forward direction of the vehicle frame illustrated in Figure 5.

By referring to the drawings and Figures 1, 2, and 3 in particular it will be seen that the spring suspension shown and described herein is particularly adapted to support in proper alignment the rear wheels of a motor vehicle. The spring as indicated in the drawings by the numeral 10 is a relatively long reversed cantilever type positioned parallel to the frame 11 and between the wheel 12 and the frame 11 by means of a trailer arm 13. The heavy end 14 of the reverse cantilever type spring 10 is mounted on a suitable mounting bracket 15 which forms a part of the trailer arm structure immediately adjacent a journal 16 formed therein (see Figure 3), by means of which journal the trailer arm 13 and the heavy end of the spring 10 are pivotally mounted on the frame 11 by means of a suitable pivot assembly 17 as shown in Figures 1 and 2. The pivot assembly 17 carries suitable bushings or bearings so as to provide for the relatively free pivotal movement of the trailer arm 13 which in turn carries the wheel 12 and which also supports the heavy end 14 of the spring 10. Still referring to the drawings it will be seen that the tapered end 18 of the spring 10 is in effect its free end and is provided with a suitable bracket 19 which in turn carries a roller 20 which is operatively positioned against a suitably shaped track 21 which is affixed to or may form a part of the frame 11. By referring to Figure 4 of the drawings an enlarged cross sectional detail view of the tapered end 18 of the spring 10 may be seen showing the same in operative relation to the track 21 and showing the roller 20 provided with suitable bearings 22.

It will thus be observed that the rear wheels of a vehicle would be supported by two relatively long reversed cantilever type springs positioned parallel to the frame, one spring on each side of the vehicle and so mounted that the vertical movement of the wheel results in the shifting of the spring mounting both with respect to the heavy end 14 thereof which is held by the pivot portion of the trailer arm 13, and to the free end 16 of the spring which is freely movable with respect to the track 21 of the frame 11. This roller and bracket 20 and 19, respectively, together with the track 21 form in effect a shackle, the spring being free of twist or side thrust and entirely supported by the frame of the vehicle and not upon the axles as it does not touch the axle at any point. It will thus be observed that as the wheel 12 on the rearmost end of the trailer arm 13 rises and falls with respect to road irregularities, the turning motion of the pivoted end of the trailer arm 13 constantly varies the effective springing ability of the spring 10 with the result that the road shocks are almost completely absorbed and the cycle of body movements of the vehicle are reduced to a rate to which the human body is accustomed, thus resulting in a comfortable ride.

By referring again to Figure 1 of the drawings it will be observed that the wheels 12 as shown therein may be driven by means of a suitable drive shaft and universal joint construction as indicated by the numerals 23 and 24 respectively, which obviously would be effectively connected to a power source preferably through a differential as is well known to the art. It has been determined that due to the unusual flexibility of the spring suspension mounting herein disclosed a plurality of universal joints are necessarily interspaced in the shaft connecting the wheel 12 and the differential (not shown). In the event that the same is found desirable it is obvious that a suitable flexible cable may be provided and positioned between the rearmost end of the trailer arm 13 and the frame 11 of the vehicle to effectively limit the degree of motion of the trailer arm particularly with respect to the widening of the distance between the frame 11 and the rearmost end of the trailer arm 13.

By referring again to Figures 1, 2, and 3 it will be observed that the pivot ends of the trailer arm 13 are of tubular cross section to effectively comprise a workable pivot assembly with respect to a tubular part of the frame of the vehicle and it will be seen that various types of bearings that may be effectively utilized in the journal 16 thereof and further that this pivot assembly is so formed that it may effectively be lubricated and that due to its relatively slow motion when in use, will be extremely long lived.

From this description it will be observed that the wheels 12 of the vehicle are maintained in alignment with the frame by the rigid pivoted arms 13 and that the vertical motion of the wheels comprises an arc and, further, that the wheels 12 are resiliently resisted by the springs 10 which support the frame upon the wheels through their unique mounting upon the pivoted ends of the arms 13.

By referring now to Figure 5 of the drawings, where, for the sake of simplicity, a vehicle frame has been simply illustrated and an arrow provided indicating normal forward direction of the said vehicle frame has been shown, it will be observed that the rear wheels 12 of the vehicle positioned as they are on the rearmost end of the trailer arms 13 will rise with a yielding motion to the road irregularities and that as the same rises the flexing of the spring 10 is directly controlled by its movable mounting on the forwardmost end of the trailer arm 13 thus resulting in a uniformly satisfactory ride.

What is claimed is:

1. In a vehicle, a vehicle frame, a pivot positioned transversely of the said frame and secured thereto, an arm pivotally mounted on said pivot and extending rearwardly therefrom, an axle positioned on the said arm, a spring supporting bracket formed on said arm over the said pivot, a spring secured at one end to the said bracket and adapted to arch over above the said axle; a roller bracket positioned on the uppermost surface of the free end of the said spring and a roller movably positioned thereon adapted to roll upon a downwardly bowed track member formed beneath the said vehicle frame.

2. In a spring suspension for supporting a portion of a frame of an automotive vehicle upon a rear wheel of the vehicle, the combination of pivot means positioned transversely of the said frame and secured thereto, an arm pivotally mounted on the said pivot member and extending rearwardly therefrom in parallel relation to side members of the said frame, said arm provided at its free end with an axle, a spring mounting bracket formed on the said arm directly over the said pivot, a double ended cantilever spring of at least twice the length of the said arm rigidly secured at its heavy end to the said spring mounting bracket and positioned over and above the said axle; and a roller bracket positioned upon the uppermost surface of the free end of the said spring, a roller movably mounted in said bracket and adapted to roll upon a downwardly curved track member formed beneath the said vehicle frame.

3. The combination in a vehicle spring construction of a transversely positioned pivot secured to said vehicle, an arm pivotally mounted on the said pivot and extending rearwardly therefrom, an axle formed on the free end of the said arm, a spring secured at one of its ends to the said arm adjacent to and over the said pivot, said spring adapted to arch over and above the said axle; and a roller mounting positioned above and fastened to the free end of the said spring, a roller in said mounting adapted to roll upon a downwardly curved track member formed beneath the said vehicle frame.

CHARLES E. LAVOIE,
EDWARD H. FAUVER,
*Administrators of the Estate of Alphonse J. Lavoie, Deceased.*